United States Patent [19]

Caldicott

[11] 4,445,581

[45] May 1, 1984

[54] SYSTEM FOR LOADING RAILROAD CARS

[75] Inventor: Jack R. Caldicott, Barrington, Ill.

[73] Assignee: Mangood Corporation, Chicago, Ill.

[21] Appl. No.: 415,164

[22] Filed: Sep. 7, 1982

[51] Int. Cl.³ .................... G01G 21/22; G01G 19/52
[52] U.S. Cl. .................................. 177/163; 177/50;
177/DIG. 8
[58] Field of Search ............................... 177/163, 50

[56] References Cited

U.S. PATENT DOCUMENTS 4,094,367 6/1978 Jones et al.
4,258,809 3/1981 Jones
4,401,175 8/1983 Caldicott ........................... 177/163

Primary Examiner—E. A. Goldberg
Assistant Examiner—Patrick W. Foster
Attorney, Agent, or Firm—George H. Gerstman

[57] ABSTRACT

A method and apparatus are provided for loading railroad cars coupled in motion. Prior to loading, an "empty" composite weight is obtained of the front and rear trucks of an empty selected railroad car, the rear truck of the adjacent forward railroad car with load and the front truck of the adjacent rearward railroad car. This "empty" composite weight is stored in a memory. The dynamic composite weight during loading is sensed. A desired net weight of the load (to be loaded into the selected railroad car) is selected. A total composite weight that is equal to the "empty" composite weight plus the desired net weight of the load is stored in a memory. The selected railroad car is loaded until the dynamic composite weight appears equal to the total composite weight. The actual net weight of the load is then determined by substracting the empty composite weight from the actual total composite weight. By loading the selected railroad car in this manner, the net weight calculation will not be subject to error caused by weight transfer through couplers.

16 Claims, 8 Drawing Figures

SYSTEM FOR LOADING RAILROAD CARS

BACKGROUND OF THE INVENTION

The present invention concerns a novel method for loading railroad cars coupled in motion.

Over the last few years, the need to load railroad cars to their optimum carrying capacity has become increasingly apparent. Escalating railroad maintenance costs have driven railroads to adopt a much stronger position on overloading, often to the point of refusing to haul overloaded cars or imposing significant financial penalties. At the same time, freight costs are frequently based on minimum loads. In other words, freight is charged on the capacity of the car or the actual amount carried, whichever is greater. Therefore, underloaded cars result in freight being paid for products not actually shipped.

Therefore, it is essential to load the railroad cars within close limits to avoid financial penalties. I have discovered a novel system which uses a track scale to monitor the product loaded into the car and to automatically stop the loading when the required amount has been loaded into the car. Although it has always been desirable to load railroad cars to as high an accuracy as practicable, there are many factors which are present and which effect such accuracy. These factors include errors caused by weight transfer through couplers on loadout scales and weight transfer through couplers on tare scales. Other error factors include weighing and control system response times and repeatability, the accuracy of the weighing scales (static and dynamic), the weight buildup on the scales due to spillage, the amount of product going into the car after the final cutoff, the repeatability of the loading gate response time, the consistency of the product density, the consistency of the product flow at a given loading gate opening and the time available for loading.

I have discovered a system which alleviates loading errors due to weight transfer through the car couplers and effectively provides a weighing apparatus and method with the same accuracy as a bin type loadout system. My system has the ability to operate as a net weight loading system and can also be readily retrofitted to existing loadouts.

Other advantages of the present invention will become apparent as the description proceeds.

BRIEF DESCRIPTION OF THE INVENTION

In accordance with the present invention, a method is provided for loading railroad cars coupled in motion. A railroad car to be loaded is selected. Prior to loading, the composite weight of the front truck of the selected railroad car and the rear truck of the adjacent railroad car forward of the selected railroad car is obtained. Prior to loading, the composite weight of the rear truck of the selected railroad car and the front truck of the adjacent railroad car behind the selected railroad car is obtained. A desired predetermined net weight of the load is selected and the selected railroad car in motion is loaded until a total composite weight is reached that is about equal to the composite weights plus the predetermined net weight of the load.

The net weight of the load is determined by subtracting the composite weights from the actual total composite weight.

In the illustrative embodiment, the position of the selected railroad car and the adjacent railroad cars with respect to at least one weighing scale is detected. The loading of the selected railroad car is initiated when the selected railroad car is in a predetermined location. A signal is provided when the selected railroad car is detected to be in the predetermined location to initiate the loading.

In the illustrative embodiment, an apparatus is provided for loading railroad cars coupled in motion. The apparatus includes means for detecting the position of a selected railroad car to be loaded. Also included is means for obtaining (a) the composite weight of the front truck of the selected railroad car and the rear truck of the adjacent railroad car forward of the selected railroad car and (b) the composite weight of the rear truck of the selected railroad car and the front truck of the adjacent railroad car behind the selected railroad car.

Means are provided for storing data representing the composite weights when the selected railroad car is empty. The dynamic composite weights when the car is being loaded are sensed.

Means are provided for calculating a target weight comprising the empty composite weights plus a selected net weight of the load. Means are provided for storing data representing the target weight. Means are provided for comparing the dynamic composite weights with the target weight data. There are means for providing a loading signal when the selected railroad car is in a predetermined location and for providing a loading termination signal when the dynamic composite weights about equals the target weight.

In the illustrative embodiment, means are provided for determining the net weight of the load and means are provided for adjusting the target weight calculating means in response to the net weight determining means. The net weight determining means comprises means for substracting the empty composite weights from the actual total composite weight.

A more detailed explanation is provided in the following description and claims, and is illustrated in the accompanying drawings.

DETAILED DESCRIPTION OF THE ILLUSTRATIVE EMBODIMENTS

Figure 1:
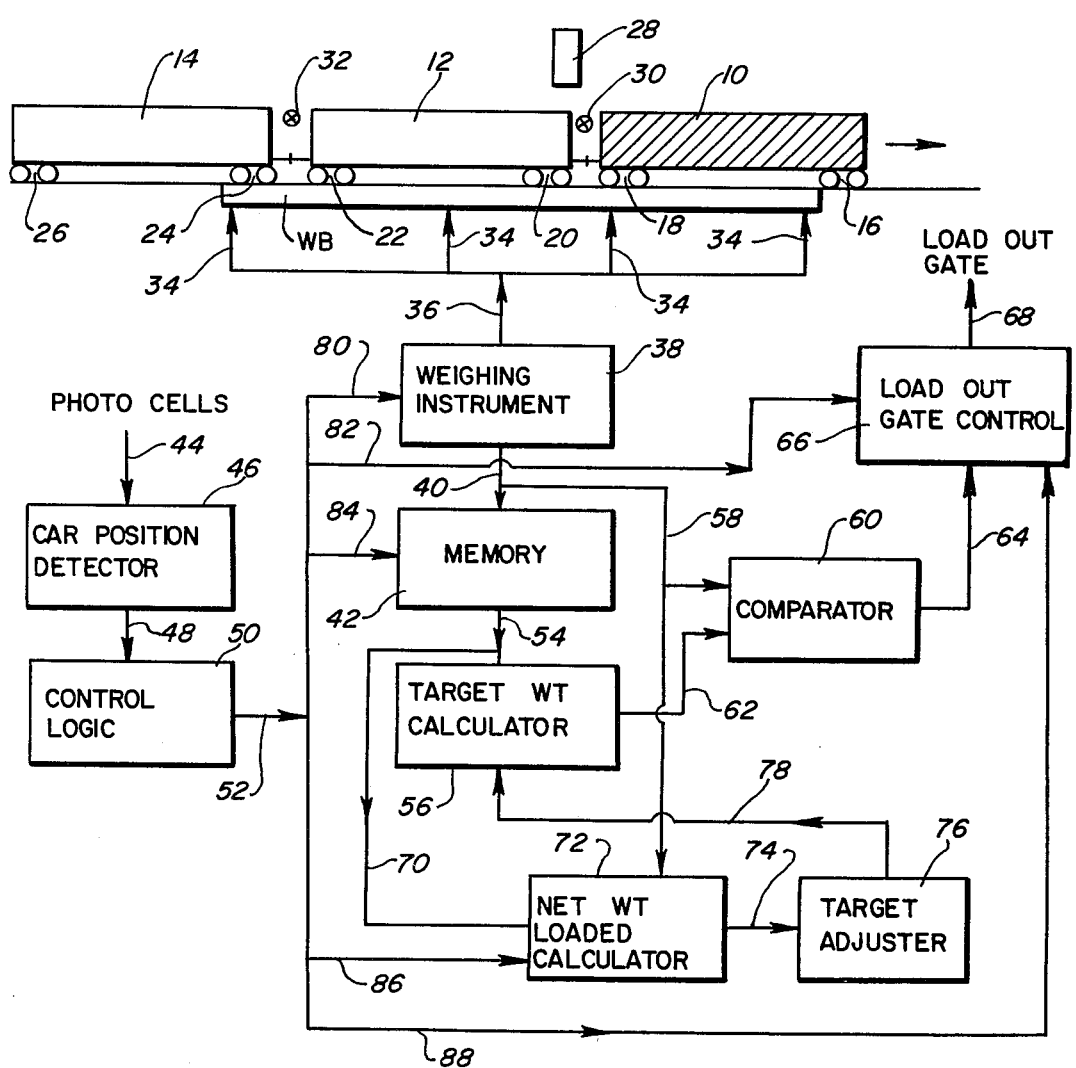
FIG. 1 is a schematic block diagram of a method and apparatus of loading railroad cars coupled in motion, constructed in accordance with the principles of the present invention.

Referring to FIG. 1, a train is diagrammatically illustrated without the locomotive being shown, but with a first freight car 10 in the form of a coal car, a second freight car 12 in the form of a coal car and a third freight car 14 in the form of a coal car. Cars 10, 12 and 14 are coupled to each other in the conventional manner and are moving in the rightward direction with respect to FIG. 1. Car 10 has a front truck 16 and a rear truck 18, car 12 has a front truck 20 and a read truck 22 and car 14 is shown with front truck 24 and rear truck 26.

As the train moves from left to right, the cars pass over a weigh bridge WB. Overlying the weigh bridge there is a chute 28 through which coal passes when a loadout gate is opened. In FIG. 1, car 10 is shown as shaded, which represents a loaded freight car. A number of photodetectors are positioned on poles in strategic locations along the track and weigh bridge and include photocells 30, 32 for detecting the position of the railroad cars in motion, in a manner known in the art. Other means for detecting the positions of the cars of the train may be utilized, such as the use of strategically placed track switches, as disclosed in Rogers U.S. Pat. No. 3,374,844. Such track switches, as disclosed in the Rogers patent, may also be used to determine the type of car, number of axles and position of the axles.

Although the illustrative embodiment concerns railroad cars coupled in motion, as used herein, the term "railroad car" is intended to embrace any freight-carrying vehicle, whether the vehicle has track wheels or road wheels.

Still referring to FIG. 1, the weight on weigh bridge WB is transmitted via transducers and lines 34 and 36 to a weighing instrument 38. Weighing instrument 38 may comprise an analog to digital converter for providing pulses that are proportional in number to the sensed weight. An output from weighing instrument 38 is fed via line 40 to a memory 42. Data representing certain weights when the train is in a particular location is stored in memory 42, as will be explained below.

The photocells 30, 32 which sense the position of the railroad cars provide a signal via line 44 to car position detector 46. The car position detector provides a signal via line 48 to control logic for providing a signal via line 52 to control various operations.

An output of memory 42 is fed via line 54 to target weight calculator 56. The output signal from weighing instrument 38 is fed via line 40 and line 58 to comparator 60 and the output from the target weight calculator 56 is fed via line 62 to comparator 60. The output from comparator 60 is fed via line 64 to a loadout gate control 66 which provides a signal via line 68 to the loadout gate at chute 28. The output of memory 42 is also fed via line 70 to a net weight loaded calculator 72, the output of which is fed via line 74 to a target adjuster 76, the output of which is fed via line 78 to target weight calculator 56. Control logic signals are fed via line 52 to weighing instrument 38 via line 80, to loadout gate control 66 via line 82, to memory 42 via line 84, to net weight loading calculator 72 via line 86, and to loadout gate control 66 via line 88.

The operation of the system of FIG. 1 is as follows:

Assume that car 12 is the selected car to be loaded. Photocell 30 senses when car 10 has passed and car 12 is approaching to provide a signal via line 44 to car position detector 46. Car position detector 46 has thus detected that car 12 is in position under chute 28 to commence loading, and that rear truck 18 of car 10, front truck 20 and rear truck 22 of car 12, and front truck 24 of car 14 are on the weight bridge WB. A signal will be provided to control logic 50 to provide a signal via line 52 to cause weighing instrument 38 to store in memory 42 an "empty" composite weight of trucks 20 and 22 of empty car 12, truck 18 of adjacent forward loaded car 10, and truck 24 of adjacent rearward empty car 14.

Assume that it is intended to load 100 tons of coal into car 12 and that the "empty" composite weight described above is 30 tons. The operator will have entered into the computer that 100 tons of coal is desired to be loaded into the selected car. Target weight calculator 56 will store a target weight that is equal to the "empty" composite weight (30 tons) plus the desired net weight of the load (100 tons) for a target weight of 130 tons. A signal will be provided via line 88 to loadout gate control 66 to initiate loading of selected car 12. As selected car 12 is being loaded, the dynamic composite weight will be sensed by weighing instrument 38 and the dynamic weight will be fed via line 58 to comparator 60. The target weight is also being fed (via line 62) to comparator 60. When the dynamic composite weight data on line 58 is equal to the target weight data on line 62, comparator 60 will issue a signal via line 64 to loadout gate control 66, thereby closing loading gate 68.

After a short delay to allow the product to settle, the total composite weight of truck 18, trucks 20 and 22 of loaded car 12, and truck 24 of empty car 14 is measured by weighing instrument 38 and fed via line 58 to net weight loaded calculator 72. The "empty" composite weight is fed from memory 42 via line 70 to net weight loaded calculator 72 and is subtracted from the total composite weight, to result in the net weight of the load which is the difference between the total composite weight and the "empty" composite weight.

In actual use, there is typically some coal that is loaded after the chute closes. The amount of extra coal may vary slightly. The actual net weight of the load is compared with the desired net weight of the load (100 tons) and a data signal representing the difference between the actual net weight of the load and the desired net weight of the load is fed via line 74 to target adjuster 76. For example, if the actual net weight of the load is 100.5 tons instead of the desired net weight of 100 tons, a signal is fed via line 78 to reduce the target weight calculator amount slightly.

In FIG. 1, a system has been shown in which the weigh bridge is of a size to monitor the composite weights of only the front and rear trucks of the selected car to be loaded, the rear truck of the adjacent forward car and the front truck of the adjacent rearward car. During the entire time that the selected car is being loaded, only those trucks will be on the weigh bridge WB. However, there are instances when the size of the freight cars are less uniform and it is still required to monitor the composite weight of only the front and rear trucks of the selected car, the rear truck of the adjacent forward car and the front truck of the adjacent rearward car. A system for enabling this operation without utilizing a single long weigh bridge is illustrated in FIGS. 2-6.

Figure 2:
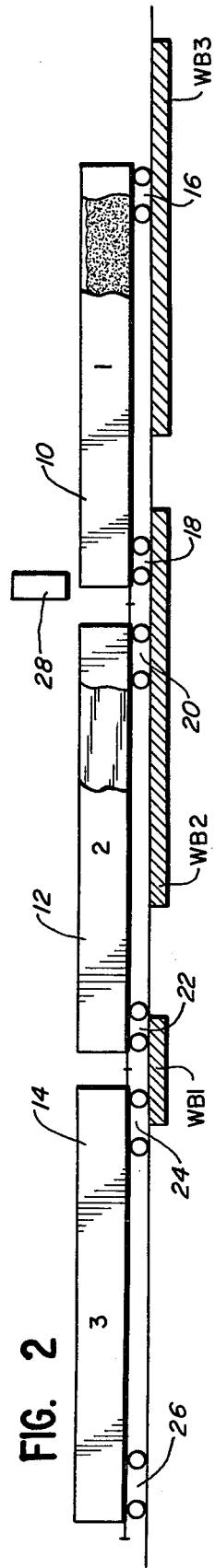
FIG. 2 is a diagram of a loading and weighing system when the railroad cars under consideration are detected to be in a first location.
Figure 3:
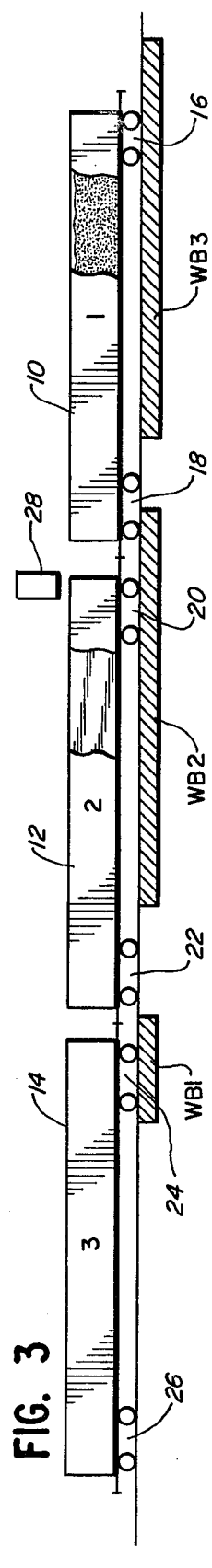
FIG. 3 is a diagram similar to FIG. 2, but with the railroad cars in a more forward position.
Figure 4:
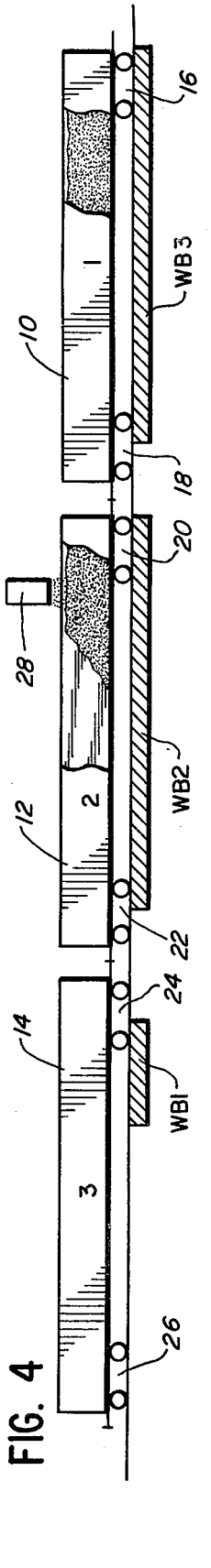
FIG. 4 is a diagram similar to FIG. 3, but with the railroad cars in a more forward position and with loading commencing with respect to the selected railroad car.
Figure 5:
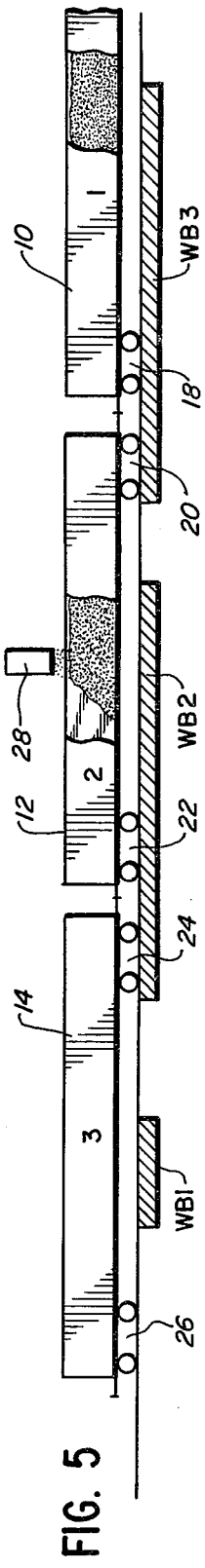
FIG. 5 is a diagram similar to FIG. 4, but with the railroad cars in a more forward position.
Figure 6:
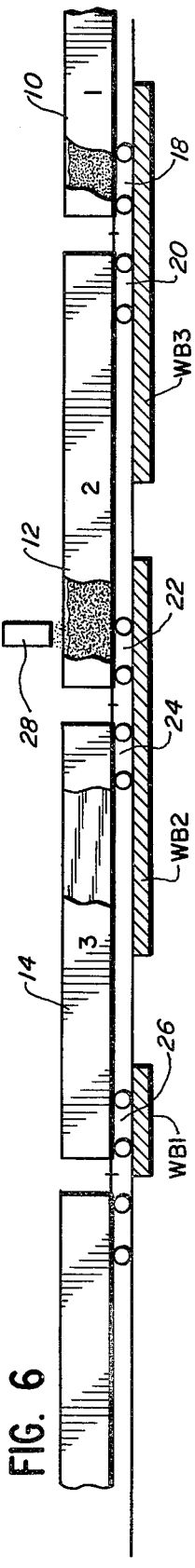
FIG. 6 is a diagram similar to the diagram of FIG. 5, but with the railroad cars in a more forward position.

Referring to FIG. 2, it can be seen that there is provided a tare scale WB1, a separated second weigh bridge WB2 and a second separated weigh bridge WB3. In FIG. 2, the composite weight of trucks 18 and 20 is measured on weigh bridge WB2 while the tare weight of truck 22 and the tare weight of truck 24 is measured on scale WB1 as the particular truck rides over scale WB1. Thus, by the time that freight car 12 is in the position illustrated in FIG. 3, in which loading is about to commence, the "empty" composite weight of truck 18 (from loaded car 10), trucks 20 and 22 from car 12 and truck 24 from car 14 has been measured and is stored in memory 42. The proper position of car 12 with respect to loading chute 28 has been detected and a control signal is fed via line 88 to loadout gate control 66 to initiate the loading of car 12. FIG. 4 shows how loading of car 12 has commenced and at the beginning of loading all of the axles are not scale-borne. However, as illustrated in FIG. 5, once there has been a substantial amount of loading, trucks 18 and 20 are scale-borne on weigh bridge WB3, and trucks 22 and 24 are scale-borne on weigh bridge WB2. In this manner, the dynamic composite weight of trucks 18, 20, 22 and 24, while car 12 is being loaded, is being measured accurately and a data signal representing this dynamic composite weight is fed via line 58 to comparator 60. Once this dynamic composite weight is equal to the target weight, a signal will be issued to close the loadout gate to chute 28.

By selecting the spacings and dimensions of tare scale WB1 and weigh bridges WB2 and WB3 strategically, the system can be utilized for loading freight cars of certain varying dimensions with the composite weight being measured accurately. As a specific example, although no limitation is intended, tare scale WB1 is 12.5 feet in length, the separation between tare scale WB1 and weigh bridge WB2 is 10 feet, weigh bridges WB2 and WB3 are each 40 feet in length and the separation between weigh bridges WB2 and WB3 is 13 feet. As another illustration, weigh bridges WB2 and WB3 may each be 45 feet in length and each separation between the tare scale and the weigh bridges may be 10 feet in length.

Figure 7:
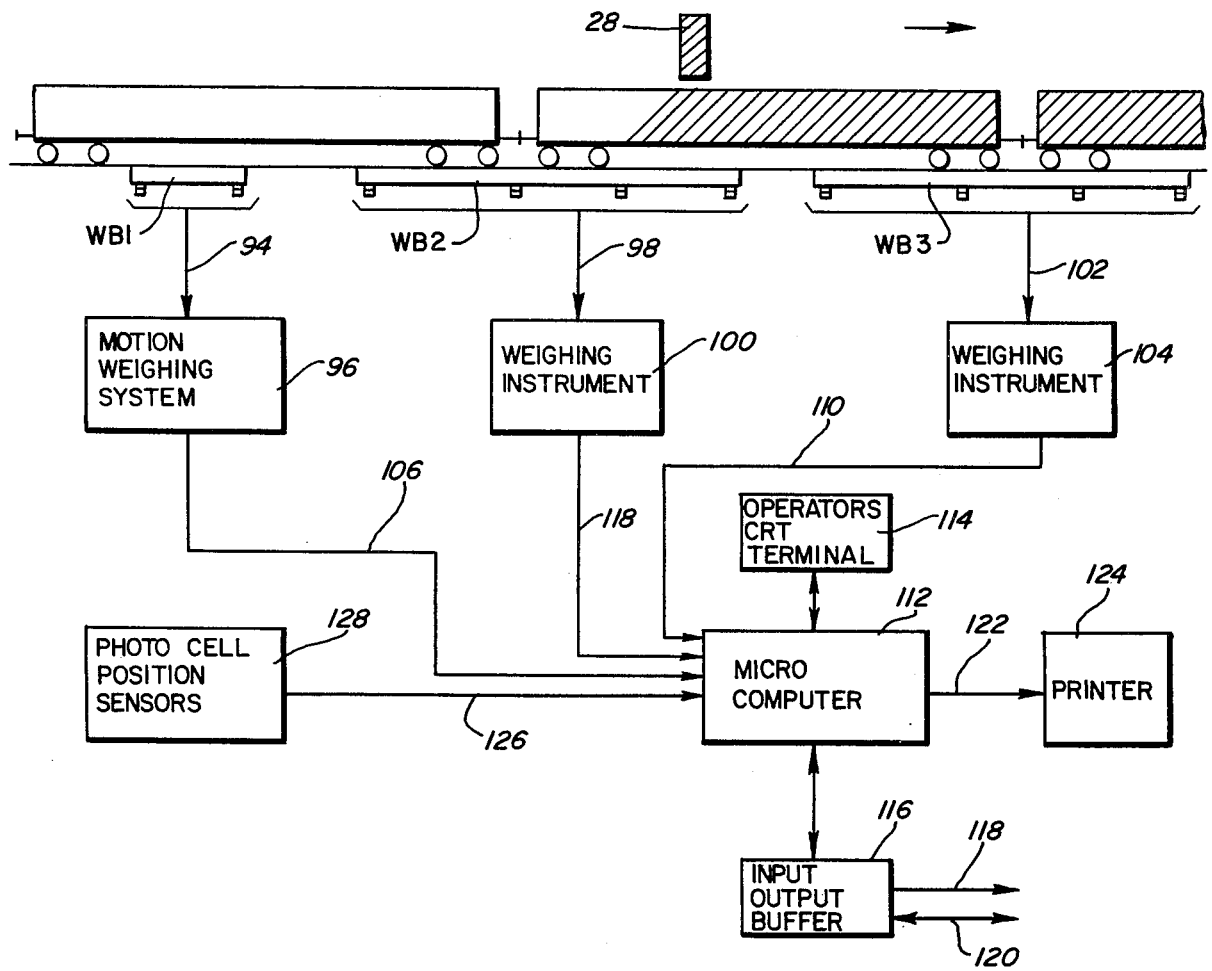
FIG. 7 is a schematic block diagram of a loading system constructed in accordance with the principles of the present invention.

Referring now to FIG. 7, a computerized system is shown therein. The analog signal from tare scale WB1 is fed via line 94 to a motion weighing system 96, preferably a StreeterAmet Model 5300A motion weighing system manufactured by the StreeterAmet Division of Mangood Corp., Grayslake, Ill. 60030. The analog signal from weigh bridge WB2 is fed via line 98 to a StreeterAmet Model 9000 weighing instrument 100 and the analog signal from weigh bridge WB3 is fed via line 102 to a StreeterAmet Model 9000 weighing instrument 104.

The outputs from weighing system 96 and weighing instruments 100 and 104 are fed via lines 106, 108 and 110, respectively, to a microcomputer 112. Microcomputer 112 interfaces with an operator's CRT terminal 114 and an input/output buffer 116 which provides a signal via line 118 to the gate and chute control and interfaces with the operator's control panel via line 120. An output from the microcomputer 112 is fed via line 122 to a printer 124. The railroad car location information is fed to the microcomputer 112 via line 126 from photocell position sensors 128.

By using the system of FIG. 7, the operator can feed the desired net weight of the load into the microcomputer 112 and the information concerning the empty composite weight, the dynamic composite weight, the total composite weight and the net weight of the load is provided to printer 124 by microcomputer 112. The microcomputer 112 also contains the memory and control logic to control the loadout gate in accordance with the car position information fed to the microcomputer via line 126 and the weight information fed to the microcomputer via lines 106, 108 and 110.

Figure 8:
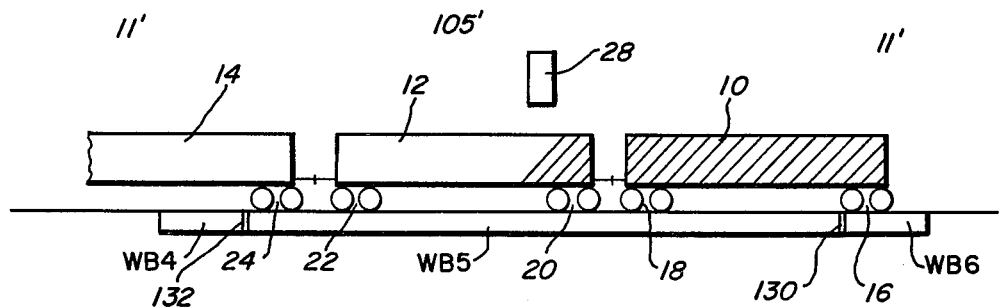
FIG. 8 is a schematic diagram of a railroad car weighing system constructed in accordance with a modified form of the invention.

Referring to FIG. 8, another type of weigh bridge system for weighing the railroad cars being loaded is illustrated therein. In the FIG. 8 embodiment, there is a first upstream weigh bridge BW4, an adjacent weigh bridge WB5 and an adjacent downstream weigh bridge WB6. While weigh bridges WB4, WB5 and WB6 are closely adjacent to each other, they can be electrically disconnected from each other when desired. In other words, switches can be automatically or manually operated to electrically disconnect weigh bridge WB4 from weigh bridges WB5 and WB6, or to disconnect weigh bridge WB6 from weigh bridges WB4 and WB5, etc.

In the operation of the system of FIG. 8, when truck 16 of car 10 passes separator 130, which separates weigh bridges WB5 and WB6 by a very short distance, a track switch will be activated to electrically disconnect weigh bridge WB6 from the system and only weigh bridges WB4 and WB5 will be providing weight information to the weighing instrument 38 (FIG. 1). It can be seen that the composite weight of trucks 18, 20, 22 and 24 will be determined by means of weigh bridges WB4 and WB5 when loading commences. Once truck 24 passes separator 132, a track switch will be actuated to disconnect weigh bridge WB4 from the system so that only weigh bridge WB5 will be determining the weight of trucks 18, 20, 22 and 24. When truck 18 actuates the track switch at separator 130, weigh bridge WB6 will again be operable with weigh bridge WB5, while weigh bridge WB4 is effectively electrically disconnected.

The track switches are strategically located and the weigh bridges are switched in and out of the system in order to provide the composite weight of only trucks 18, 20, 22 and 24, and any weigh bridges carrying other trucks will effectively be electrically disconnected from the system so that they will not feed weight data to weighing instrument 38.

By utilizing the composite weight of both trucks of the selected car being loaded, the rear truck of the adjacent forward car and the front truck of the adjacent rearward car, loading errors due to weight transfer through the car couplers are substantially eliminated and a system is provided with essentially the same accuracy as a bin-type loadout system.

Although illustrative embodiments of the invention have been shown and described, it is to be understood that various modifications and substitutions may be made by those skilled in the art without departing from the novel spirit and scope of the present invention.

What is claimed is:

1. A method of loading railroad cars coupled in motion, which comprises the steps of:
   selecting a railroad car to be loaded;
   prior to loading, obtaining the composite weight of the front truck of the selected railroad car and the rear truck of the adjacent railroad car forward of the selected railroad car;
   prior to loading, obtaining the composite weight of the rear truck of the selected railroad car and the front truck of the adjacent railroad car behind the selected railroad car;
   selecting a desired predetermined net weight of the load; and
   loading the selected railroad car in motion until a total composite weight is reached that is about equal to said composite weights plus said predetermined net weight of the load.

2. A method as described in claim 1, including the step of determining the net weight of the load by substracting said composite weights from the actual total composite weight; and storing said determined net weight.

3. A method as described in claim 1, including the steps of detecting the position of the selected railraod car and the adjacent railroad cars with respect to at least one weighing scale; initiating the loading of the selected railroad car when the selected railroad car is in a predetermined location; and providing a signal when the selected railroad car is detected to be in said predetermined location to initiate loading.

4. A method as described in claim 1, including the steps of storing in a memory said desired predetermined net weight of the load and the composite weights prior to loading; sensing the dynamic composite weight during loading; comparing said stored weights with said sensed dynamic composite weight; and providing a signal to stop the loading when said dynamic composite weight about equals said stored weights.

5. A method as described in claim 1, in which the step of obtaining the composite weight, prior to loading, of the front truck of the selected car and the rear truck of the adjacent car, is on a first weigh scale; and the step of obtaining the composite weight, prior to loading, of the rear truck of the selected car and the front truck of the adjacent car, is on a separate second weigh scale.

6. A method as described in claim 5, in which the obtaining of the total composite weight during loading is on said first weigh scale and a separate third weigh scale.

7. A method of loading railroad cars coupled in motion, which comprises the steps of:
  selecting a railroad car to be loaded;
  prior to loading, obtaining the composite weight of the front truck of the selected railroad car and the rear truck of the adjacent railroad car forward of the selected railroad car;
  prior to loading, obtaining the composite weight of the rear truck of the selected railroad car and the front truck of the adjacent railroad car behind the selected railroad car;
  selecting a desired predetermined net weight of the load;
  loading the selected railroad car in motion until a total composite weight is reached that is about equal to said composite weights plus said predetermined net weight of the load;
  detecting the position of the selected railroad car and the adjacent railroad cars with respect to at least one weighing scale;
  initiating the loading of the selected railroad car when the selected railroad car is in a predetermined location;
  providing a signal when the selected railroad car is detected to be in said predetermined location to initiate the loading;
  storing in a memory said desired predetermined net weight of the load and the composite weights prior to loading;
  sensing the dynamic composite weight during loading;
  comparing said stored weights with said sensed dynamic composite weight;
  providing a signal to stop the loading when said dynamic composite weight about equals said stored weights;
  determining the net weight of the load by subtracting said prior-to-loading composite weights from the actual total composite weight; and
  storing said determined net weight.

8. Apparatus for loading railroad cars coupled in motion, which comprises:
  means for detecting the position of a selected railroad car to be loaded;
  means for obtaining (a) the composite weight of the front truck of the selected railroad car and the rear truck of the adjacent railroad car forward of the selected railroad car, (b) the composite weight of the rear truck of the selected railroad car and the front truck of the adjacent railroad car behind the selected railroad car, and (c) the dynamic composite weights while the car is being loaded;
  means for storing said composite weights prior to loading when the selected railroad car is empty;
  means for calculating a target weight comprising the empty composite weights plus a selected net weight of the load;
  means for storing said target weight;
  means for comparing said dynamic composite weights with said target weights;
  means for providing a loading signal when the selected railroad car is in a predetermined location and for providing a loading termination signal when said dynamic composite weights about equals said target weight.

9. Apparatus as described in claim 8, including means for determining the net weight of the load and means for adjusting the target calculating means in response to said net weight determining means.

10. Apparatus as described in claim 9, said net weight determining means comprising means for subtracting the prior to loading composite weights from the actual total composite weight.

11. Apparatus for loading railroad cars coupled in motion, which comprises:
  means for obtaining the composite weight prior to loading, when a selected railroad car is empty, of the front truck of the selected railroad car and the rear truck of the adjacent railroad car forward of the selected railroad car;
  means for obtaining the composite weight prior to loading when the selected railroad car is empty, of the rear truck of the selected railroad car and the front truck of the adjacent railroad car behind the selected railroad car;
  means for storing the prior to loading composite weights;
  means for sensing the dynamic composite weight during loading;
  means for storing a total composite weight that is equal to the prior to loading composite weights plus a desired predetermined net weight of the load;
  means for loading the selected railroad car until the dynamic composite weight is about equal to the total composite weight.

12. Apparatus as described in claim 11, including means for determining the net weight of the load including means for subtracting the prior to loading composite weight from the actual total composite weight.

13. Apparatus as described in claim 12, including means for adjusting the total composite weight storage means in response to the net weight determining means.

14. Apparatus for loading railroad cars coupled in motion, which comprises:
- means for obtaining the composite weight prior to loading, when a selected railroad car is empty, of the front truck of the selected railroad car and the rear truck of the adjacent railroad car forward of the selected railroad car;
- means for obtaining the composite weight prior to loading, when the selected railroad car is empty, of the rear truck of the selected railroad car and the front truck of the adjacent railroad car behind the selected railroad car;
- means for loading the selected railroad car in motion until a total composite weight is reached that is about equal to said prior to loading composite weights plus a selected predetermined net weight of the load.

15. Apparatus as described in claim 14, including means for detecting the position of the selected railroad car to be loaded; said loading means being operable to initiate loading only when the railroad car is in a predetermined location.

16. Apparatus as described in claim 14, comprising means for determining the net weight of the load including means for subtracting the prior to loading composite weight from the actual total composite weight.

* * * * *